United States Patent
Wu

(10) Patent No.: US 9,714,762 B2
(45) Date of Patent: Jul. 25, 2017

(54) LED PHOTO-ELECTRIC SOURCE ASSEMBLY AND LED ROAD LAMP

(75) Inventor: Chun-wei Wu, Guangzhou (CN)

(73) Assignee: NANKER(GUANG ZHOU)SEMICONDUCTOR MANUFACTURING CORP., Guangzhou, Guangdong (CN)

(*) Notice: Subject to any disclaimer, the term of this patent is extended or adjusted under 35 U.S.C. 154(b) by 399 days.

(21) Appl. No.: 14/349,002

(22) PCT Filed: Aug. 9, 2012

(86) PCT No.: PCT/CN2012/079863
§ 371 (c)(1),
(2), (4) Date: Apr. 7, 2014

(87) PCT Pub. No.: WO2013/049982
PCT Pub. Date: Apr. 11, 2013

(65) Prior Publication Data
US 2014/0247608 A1 Sep. 4, 2014

(30) Foreign Application Priority Data

Oct. 2, 2011 (CN) .......................... 2011 1 0303619
Dec. 13, 2011 (CN) .......................... 2011 1 0416430

(51) Int. Cl.
*F21V 29/02* (2006.01)
*F21V 23/02* (2006.01)
(Continued)

(52) U.S. Cl.
CPC ................ *F21V 29/67* (2015.01); *F21S 8/00* (2013.01); *F21V 19/0055* (2013.01);
(Continued)

(58) Field of Classification Search
CPC .... F21V 23/023; F21V 23/009; F21V 29/673; F21V 29/773; F21V 31/00; F21V 31/005; F21V 5/04; F21V 5/007; F21S 8/00
See application file for complete search history.

(56) References Cited

U.S. PATENT DOCUMENTS 4,729,076 A * 3/1988 Masami ................ B61L 5/1854
165/104.33
5,782,555 A * 7/1998 Hochstein ............ B60Q 1/2696
362/294
(Continued)

FOREIGN PATENT DOCUMENTS

CN 2926777 Y 7/2007
CN 101382270 A 3/2009
(Continued)

OTHER PUBLICATIONS

"What is Mica," Mar. 15, 2000; http://www.anjanagroup.com/mica_tech1.htm.*
(Continued)

*Primary Examiner* — Andrew Coughlin
*Assistant Examiner* — Colin Cattanach
(74) *Attorney, Agent, or Firm* — Leason Ellis LLP

(57) ABSTRACT

An LED photo-electric source assembly includes a radiator, a radiating fan, a driving circuit board subassembly, an LED light source component, an upper cover of a power supply box, a lower cover of the power supply box and a waterproof bolt component. The radiator comprises a bottom plate, on top of which a radiating part is provided. A space area of the radiating part contains a dust-proof, water-proof fan. An LED road lamp further includes an LED photo-electric source assembly, an installing board and a housing assembly of a traditional road lamp for containing light source. A light outlet arranged on the installing board adapts in size and shape to an opening arranged at the bottom of the housing
(Continued)

assembly. The LED photo-electric source assembly is fixedly connected to the installing board and emits light. The installing board is fixedly connected with the housing assembly through a clamping fixture.

12 Claims, 16 Drawing Sheets

(51) Int. Cl.
| | |
|---|---|
| F21V 29/67 | (2015.01) |
| F21S 8/00 | (2006.01) |
| F21V 19/00 | (2006.01) |
| F21V 31/00 | (2006.01) |
| F21V 23/00 | (2015.01) |
| F21W 111/02 | (2006.01) |
| F21V 17/12 | (2006.01) |
| F21V 5/00 | (2015.01) |
| F21W 131/103 | (2006.01) |
| F21V 5/04 | (2006.01) |
| F21V 29/77 | (2015.01) |
| F21Y 105/10 | (2016.01) |
| F21Y 115/10 | (2016.01) |

(52) U.S. Cl.
CPC .......... *F21V 23/009* (2013.01); *F21V 23/023* (2013.01); *F21V 29/673* (2015.01); *F21V 31/00* (2013.01); *F21V 31/005* (2013.01); *F21V 5/007* (2013.01); *F21V 5/04* (2013.01); *F21V 17/12* (2013.01); *F21V 29/773* (2015.01); *F21W 2111/02* (2013.01); *F21W 2131/103* (2013.01); *F21Y 2105/10* (2016.08); *F21Y 2115/10* (2016.08); *Y02B 20/72* (2013.01)

(56) References Cited

U.S. PATENT DOCUMENTS

| | | | | |
|---|---|---|---|---|
| 5,785,418 | A * | 7/1998 | Hochstein | B60Q 1/2696 362/294 |
| 5,794,685 | A * | 8/1998 | Dean | H01L 23/367 165/121 |
| 5,857,767 | A * | 1/1999 | Hochstein | F21V 29/89 362/294 |
| 6,023,413 | A * | 2/2000 | Umezawa | H01L 23/467 165/80.3 |
| 6,157,539 | A * | 12/2000 | Wagner | H01L 23/4006 165/121 |
| 6,373,698 | B1 * | 4/2002 | Christensen | G06F 1/20 174/16.1 |
| 7,524,089 | B2 * | 4/2009 | Park | F21K 9/135 362/294 |
| 7,959,332 | B2 * | 6/2011 | Tickner | F21S 8/02 362/249.02 |
| 8,066,410 | B2 * | 11/2011 | Booth | F21K 9/00 361/697 |
| 8,199,502 | B2 * | 6/2012 | Ji | H01L 23/467 361/697 |
| 2004/0222516 | A1 * | 11/2004 | Lin | F21V 29/004 257/712 |
| 2005/0139348 | A1 * | 6/2005 | Lu | H05K 7/20172 165/104.33 |
| 2007/0047238 | A1 * | 3/2007 | Vukosic | B60Q 1/2611 362/368 |
| 2008/0068799 | A1 * | 3/2008 | Chan | F21V 29/004 361/697 |
| 2009/0195159 | A1 * | 8/2009 | Smith | F21V 25/04 315/33 |
| 2010/0002448 | A1 * | 1/2010 | Shih | F21V 7/09 362/296.05 |
| 2010/0060130 | A1 * | 3/2010 | Li | F21V 29/004 313/46 |
| 2010/0060132 | A1 * | 3/2010 | Liu | F21V 29/02 313/46 |
| 2010/0134046 | A1 * | 6/2010 | Holder | F21V 29/70 315/297 |
| 2010/0135025 | A1 * | 6/2010 | Chien | F21V 29/02 362/294 |
| 2010/0238662 | A1 * | 9/2010 | Lu | F16J 15/106 362/249.02 |
| 2010/0259934 | A1 * | 10/2010 | Liu | F21V 29/004 362/294 |
| 2010/0264826 | A1 * | 10/2010 | Yatsuda | F21K 9/00 315/112 |
| 2010/0295451 | A1 * | 11/2010 | Hsu | F21V 29/02 315/113 |
| 2011/0019402 | A1 * | 1/2011 | Mo | F21S 8/04 362/235 |
| 2011/0031864 | A1 * | 2/2011 | Rebergen | F21K 9/00 313/11 |
| 2011/0128746 | A1 * | 6/2011 | Zheng | F21V 15/01 362/373 |
| 2011/0141700 | A1 * | 6/2011 | Liu | G06F 1/20 361/720 |
| 2011/0156587 | A1 * | 6/2011 | Wu | F21V 23/02 315/35 |
| 2011/0169391 | A1 * | 7/2011 | Mo | F21K 9/00 313/46 |
| 2011/0170295 | A1 * | 7/2011 | Shen | F21V 29/02 362/294 |
| 2012/0025711 | A1 * | 2/2012 | Best | F21S 8/086 315/113 |
| 2012/0033419 | A1 * | 2/2012 | Kim | F21S 8/026 362/235 |
| 2012/0038272 | A1 * | 2/2012 | De Castro | F21S 48/1154 315/35 |
| 2012/0099319 | A1 * | 4/2012 | Liu | F21S 2/005 362/249.02 |
| 2012/0120658 | A1 * | 5/2012 | Wilk | F21S 8/02 362/249.02 |
| 2012/0126644 | A1 * | 5/2012 | Wu | H02K 5/12 310/64 |
| 2012/0212945 | A1 * | 8/2012 | Frank | F21S 2/005 362/184 |
| 2012/0281409 | A1 * | 11/2012 | Patkus | F21V 23/003 362/249.02 |
| 2015/0159851 | A1 * | 6/2015 | Li | F21K 9/233 362/294 |

FOREIGN PATENT DOCUMENTS

| | | |
|---|---|---|
| CN | 201232694 Y | 5/2009 |
| CN | 101498412 A | 8/2009 |
| CN | 101551073 A | 10/2009 |
| CN | 101749555 A | 6/2010 |
| CN | 201593707 U | 9/2010 |
| CN | 201731402 U | 2/2011 |
| CN | 201753873 U | 3/2011 |
| CN | 102155699 A | 8/2011 |
| CN | 102352975 A | 2/2012 |
| CN | 102434799 A | 5/2012 |
| CN | 102434822 A | 5/2012 |
| CN | 202228980 U | 5/2012 |
| CN | 202253204 U | 5/2012 |
| CN | 202392516 U | 8/2012 |
| WO | WO-2009/026736 A | 3/2009 |

OTHER PUBLICATIONS

International Search report mailed Nov. 22, 2012 for the corresponding PCT Application No. PCT/CN2012/079863.

\* cited by examiner

LED PHOTO-ELECTRIC SOURCE ASSEMBLY AND LED ROAD LAMP

CROSS-REFERENCE TO RELATED PATENT APPLICATIONS

This application is a U.S. National Phase Application under 35 U.S.C. §371 of International Patent Application No. PCT/CN2012/079863 filed on Aug. 9, 2012, and claims the benefit of Chinese Patent Application No. 201110303619.6 filed on Oct. 2, 2011 and No. 201110416430.8 filed on Dec. 13, 2011, the entire contents of which are incorporated by reference as if set forth in their entirely herein. The International Application was published on Apr. 11, 2013 as International Publication No. WO/2013/049982 under PCT Article 21(2).

FIELD OF THE INVENTION

The present invention relates to an LED photo-electric source assembly. Also, the present invention relates to a road lamp, further to an LED road lamp improved from traditional road lamp.

BACKGROUND OF THE INVENTION

At present, the road lamp is a familiar lamp. The traditional road lamp is usually made with a halogen lamp, such as a sodium lamp, which have high power consumption, short service life and low light efficiency. For example, in FIG. 1, a structure diagram of a traditional road lamp with uncovered back is shown. The traditional lamp holder comprises a housing assembly 100, a reflector 200, a sodium light source 300, a sodium light electric source 400, and a glass protection diffuser 500. LEDs, such as LED road lamps, have been more widely applied due to their advantages of high light efficiency, long service life and low power consumption. In considering heat dissipation, their radiators are exposed, and the traditional lamp is so small due to LEDs own small volume, thereby current road lamps' shape are strange and monotonous.

Also for a district using a traditional road lamp, it is necessary to disassemble entirely if a currently used LED road lamp is to be replaced; for example, if one cannot use an traditional road lamps' holder any more but needs to use a new LED road lamp holder. So this will cause repeated investment and waste. And if the improved LED road lamp was broken, it is necessary to use a new LED road lamp holder to replace and then disassemble and take back to check. It will be much trouble to maintain with low efficiency and high cost.

Also, the applicant has used an above mentioned method to develop a high power LED road lamp, but radiating air can not directly outflow to outside. Even if the air flows circularly and is convective, it also needs to heat change through outer casing and outer air. This will cause high temperature on outer casing as well as inner casing, and heat cannot dissipate.

When an LED is applied for daily lighting and to achieve lighting requirements, it is necessary to centralize multi-power LEDs to one lamp, so LEDs heat dissipation is a most important element to affect LED lamp use condition and service life, especially for a high power LED lamp. Heat dissipation has become a technological difficulty for wide application of the device.

A traditional LED lamp is equipped with passive heat dissipation, which uses radiators or similar devices for cooling. So when one needs to improve heat dissipation effects, it is necessary to increase heat dissipation area as much as possible, but this will cause the size of a current LED lamp to become bigger and make the structure more complicated. Also, the heat dissipation effect is unsatisfied. In order to overcome these drawbacks, presented herein are embodiments directed to a combined radiating fan and a radiator, as applied to an LED lamp with initiative heat dissipation and passive heat dissipation, thereby improving stabilization and service life. But in exchange for improving the heat dissipation effect on a high power road lamp, the resulting open structure has poor waterproofing and dust-proofing characteristics. Thus application can be restricted by outside and other special conditions. Also it may be necessary to design a much more complicated ventilation structure for increasing heat dissipation.

Currently, thermally conductive silicone and thermally conductive empire cloth are used to conduct heat and insulate between a light source board and radiator. The heat conductivity coefficient for thermally conductive silicone is 3 W/(m·K)-4 W/(m·K), and the heat conductivity coefficient for thermally conductive empire cloth is 2 W(m·K)-3 W/(m·K). Both are unsatisfactory due to low heat conductivity coefficients. Also, thermally conductive silicone is made of an unstable paste so it is difficult to spread evenly between the light source board and radiator. This will cause poor thermal conductivity and reduce insulating properties, thereby causing a short circuit. Thermally conductive empire cloth is easy to transform, and can also be troublesome to install and less efficient.

SUMMARY OF THE INVENTION

The present invention intends to overcome deficiencies of the prior art and provide an LED photo-electric source assembly, which is simple in structure and effective in heat dissipation.

Further, the present invention also provides an LED road lamp with low cost with a similar shape as traditional road lamps, and easier disassembly than a traditional road lamp. This kind of road lamp can be improved and maintained in the field.

The technical solutions adopted in the present invention are:

An LED road lamp improved from traditional road lamp, comprises an LED photo-electric source assembly, an installing board, and a housing assembly of a traditional road lamp for containing light source, wherein a light outlet arranged on the installing board adapts in size and shape to an opening arranged at the bottom of the housing assembly; the LED photo-electric source assembly is fixedly connected to the installing board and emits light through the light outlet and the installing board is fixedly connected with the housing assembly through a clamping fixture; the LED photo-electric source assembly comprises a radiator, a radiating fan, a driving circuit board subassembly, an LED light source component, an upper cover of a power supply box, a lower cover of the power supply box, and a waterproof bolt component, wherein the LED light source component comprises several LED chips and a LED submount; the radiator comprises a bottom plate whose underside is flat, on the top face of which a radiating part having a plurality of fins extending perpendicularly outward from the top face that are spaced a distance apart from one another in a circular or cylindrical arrangement is provided; the LED submount is fixedly connected to the bottom plate transmitting heat; in the central area of the upper part of radiating part, a space area is provided for containing the radiating fan i.e. dust-proof and water-proof fan; in the air intake and air outlet of the radiating fan two fan guards are provided; on the top of the radiating fan the lower cover is fixedly connected to radiator; the upper cover and the lower cover are sealed joint and the driving circuit board subassembly is inside; the waterproof bolt component connects the port which a power wire going through the upper cover.

Further, several installing holes are on the installing board around the light outlet; install bolts are fixedly connected to the installing board by going through the installing holes by a nut, afterwards the installing hole of the LED photo-electric source assembly is sleeved to the install bolt, and another nut or a snap joint is fixedly connected to install bolts, and the LED photo-electric source assembly components are fixedly connected to the installing board.

Further, several ventilation slots or ventilation holes in the installing board are provided.

Further, a install hole for fan is provided in the installing board, and an outer radiating fan is on the install hole.

Further, the clamping fixture comprises a roll forming plate and several fastening screws; several install columns with thread are arranged around the opening at the bottom of the housing assembly, on which is the edge of the installing board overlapping joint; a waterproof jacket is arranged around the edge of installing board; the bottom of the roll forming plate holds down the installing board, and the top of the roll forming plate is fixedly connected to the install column by the fastening screw; and the installing board is fixedly connected to the housing assembly.

Further, a thermal insulation synthetic mica sheet is between the LED submount and the bottom plate, the edge of which extends 1-10 mm outward from the edge of the LED submount; the LED submount and the bottom plate are fixed through several first bolts, an insulating component (e.g., an insulating rubber) fixed to the first bolts is in electrical isolation between the LED submount with the bottom plate and first bolts; the LED photo-electric source assembly further comprises an annular insulator board, which is in the sealed space by the upper cover and the lower cover, inside of which the driving circuit board subassembly is provided.

Further, several third bolts are fixedly connected to a radiator orderly going through the upward fan guard of the radiating fan, the radiating fan and the downward fan guard of which; the upper cover and the lower cover are fixedly connected by the fourth bolts and one or more nuts; at least two shores protruding out of the radiator part on the back of the radiator are provided, and the shores supporting the lower cover are 10-50 mm above the top surface of the radiating fan; several double-screw bolts with internal thread on head and external thread on tail are fixedly connected to the shores going through the lower cover; several fifth bolts are fixedly connected with the internal thread of the double-screw bolts going through the driving circuit board subassembly; the height of the head of the double-screw bolts which includes the internal thread inside is 5-10 mm; the outline of the radiator is circular, and the upper cover and the lower cover are also circular.

Further, the LED photo-electric source assembly comprises a lens and a decorate circle; wherein the lens and the decorate circle are fixedly connected to the bottom of the radiator; a silicone waterproof gasket is in the connector of the lens with the bottom of the radiator, that is fixedly connected to the second bolts; several installing holes surrounding the decorate circle are provided.

Further, the LED photo-electric source assembly components further comprise a wind scooper with a flared shape; the wind scooper is fixedly connected to the radiator by several connecting bolts across the top edge of the wind scooper, which surround the side of the radiating part; an annular air outlet between the bottom of the wind scooper and the bottom of the radiator is provided; the outside air flow into the radiating fan from the space between the lower cover with the radiator, and flow outside through the annular air outlet through the channel inside of the radiating part; the bottom of the wind scooper is arranged on an outer edge, which holds down the installing board and is fixedly connected by bolts, adapts in size to the gap on installing board; the air inside the housing assembly flows outside through the annular air outlet by the radiator fan.

Further, the LED photo-electric source assembly comprises a lens, which is fixedly connected to bottom of the radiator by the second bolts and the silicone waterproof gasket; and comprises several installing holes in an area around the wind scooper.

The present invention has advantageous effects as below. According to the LED photo-electric source assembly that comprises a radiator, a radiating fan, a driving circuit board subassembly, an LED light source component, an upper cover of a power supply box, a lower cover of the power supply box, and a waterproof bolt component, wherein the LED light source component comprises several LED chips and LED submount; the radiator comprises a bottom plate whose underside is flat, on the top face of which a radiating part having a plurality of fins extending perpendicularly outward from the top face that are spaced a distance apart from one another in a circular or cylindrical arrangement is provided; the LED submount is fixedly connected to the bottom plate transmitting heat; in the central area of the upper part of radiating part, a space area is provided for containing the radiating fan i.e. dust-proof and water-proof fan; in the air intake and air outlet of the radiating fan two fan guards are provided; on the top of the radiating fan the lower cover is fixedly connected to radiator; the upper cover and the lower cover are sealed joint and the driving circuit board subassembly is inside; the waterproof bolt component connects a port by which a power wire goes through the upper cover. The power wire can be sealed by the waterproof bolt component to achieve waterproofing and dustproofing; further the radiating fan part is waterproof and dustproof, thereby waterproofing and dustproofing the whole lamp, and it is especially suitable for road lamp; further this LED lamp has initiative heat dissipation and passive heat dissipation after combining the radiating fan to the radiator, to improve stabilization and service life. In a word, this invention of the LED photo-electric source assembly is simple structure, good heat dissipation, good waterproof and dust proof.

Further, this invention of the LED photo-electric source assembly which comprises a wind scooper with a flared shape; the wind scooper is fixedly connected to the radiator by several connecting bolts across the top edge of the wind scooper, which surrounds the side of the radiating part; an annular air outlet between bottom of the wind scooper and the bottom of the radiator is provided; the outside air flows into the radiating fan from the space between the lower cover with the radiator, and flows outside through the annular air outlet after through the channel inside of the radiating part. The air on radiating fan can be deflected by the wind scooper and made to fully flow in by the top and out by the bottom, this will avoid a blind area and turbulence, and also avoid the abuse by cooling air unable to disperse with high temperature on internal recycling. The cooling air flows to outside quickly and reduces the lamp's working temperature. Also, the annular air outlet between the bottom of wind scooper and radiator can enhance the LED lights, so this invention of the LED photo-electric source assembly has a simple structure, low cost, good effect on heat dissipation, also optimizes the channel for cooling air flow. Applying this LED photo-electric source assembly to the LED road lamp, makes inner and outer air on outer casing flow circularly, thereby avoiding high temperature on the inner circumference of the outer casing, avoiding the need to install an extra outer exhaust fan, and will not affect the lamp's appearance; also improve the product's stabilization; further, the annular air outlet between the bottom of wind scooper and radiator enhanced LED lights, so this invention of LED road lamp has a simple structure, good heat dissipation, low inner working temperature, and no more extra cost.

This invention of the LED photo-electric source assembly wherein a thermal insulation synthetic mica sheet is disposed between the LED submount and the bottom plate, the edge of which extends 1-10 mm outward from the edge of the LED submount; the synthetic mica sheet composed of Mica mineral raw materials and then the mica sheet is pressed between the LED submount and the bottom plate with mucilage glue at a high temperature, advantageously providing excellent thermal conductivity, fire resistance and electrical insulating property, homogeneous thick, adjustable area/size, flexibility and processability. The heat conductivity coefficient for the synthetic mica sheet is 5 W/(m·K)-24 W/(m·K), which is higher than currently used thermally conductive silicone (3 W/(m·K)-4 W/(m·K)), and conductive empire cloth (2 W(m·K)-3 W/(m·K)); both heat conductivity coefficients being low and having bad heat dissipation effects. Also, thermally conductive silicone is an unstable paste so it is difficult to spread evenly between light source board and radiator, so this will cause bad thermal conductivity and reduce insulating properties, and further will cause short circuits; thermally conductive empire cloth is easy to transform, also troublesome to install and poor efficiency. But mica sheet is stable with higher uniformity, so it can make the LED submount and bottom plate couple closely and uniformly, to provide better heat dissipation, insulating properties, also is easily installed, and highly efficient. Due to the edge of mica sheet being extending 1-10 mm outward from the edge of LED submount, it can be meet the requirements of creepage distances between LED submount and radiator to improve safety. So this invention of the LED photo-electric source assembly has a simple structure, higher production efficiency, good thermal insulation.

In one or more embodiments, the LED road lamp improves upon the traditional road lamp comprising an LED photo-electric source assembly, an installing board, and a housing assembly of a traditional road lamp for containing a light source, wherein a light outlet arranged on the installing board adapts in size and shape to an opening arranged at the bottom of the housing assembly; the LED photo-electric source assembly being fixedly connected to the installing board and emitting light through the light outlet and the installing board is fixedly connected with the housing assembly through a clamping fixture. This invention uses a traditional road lamp's outer casing as the LED road lamp's, and removes the traditional reflector, sodium light source, sodium power source, and glass protection diffuser, and then takes the LED photo-electric source assembly and installing board to fix in the outer casing by traditional road lamp's holding fixed device, its appearance fully remains traditionally the same. Also, through this easy install method, not only easy disassembly and installation locally, but also one can use the LED photo electric source to directly replace a broken one, thereby avoiding having to take the whole lamp holder back to the factory to check, and therefore has high efficiency on improvement and maintenance. Also costs are reduced and repeated investments and waste are avoided, so this road lamp improves the traditional road lamp with low cost, with the same appearance as a traditional one, which can be easily removed and has high installation efficiency.

DETAILED DESCRIPTION OF THE INVENTION

Embodiment I

Figure 1:
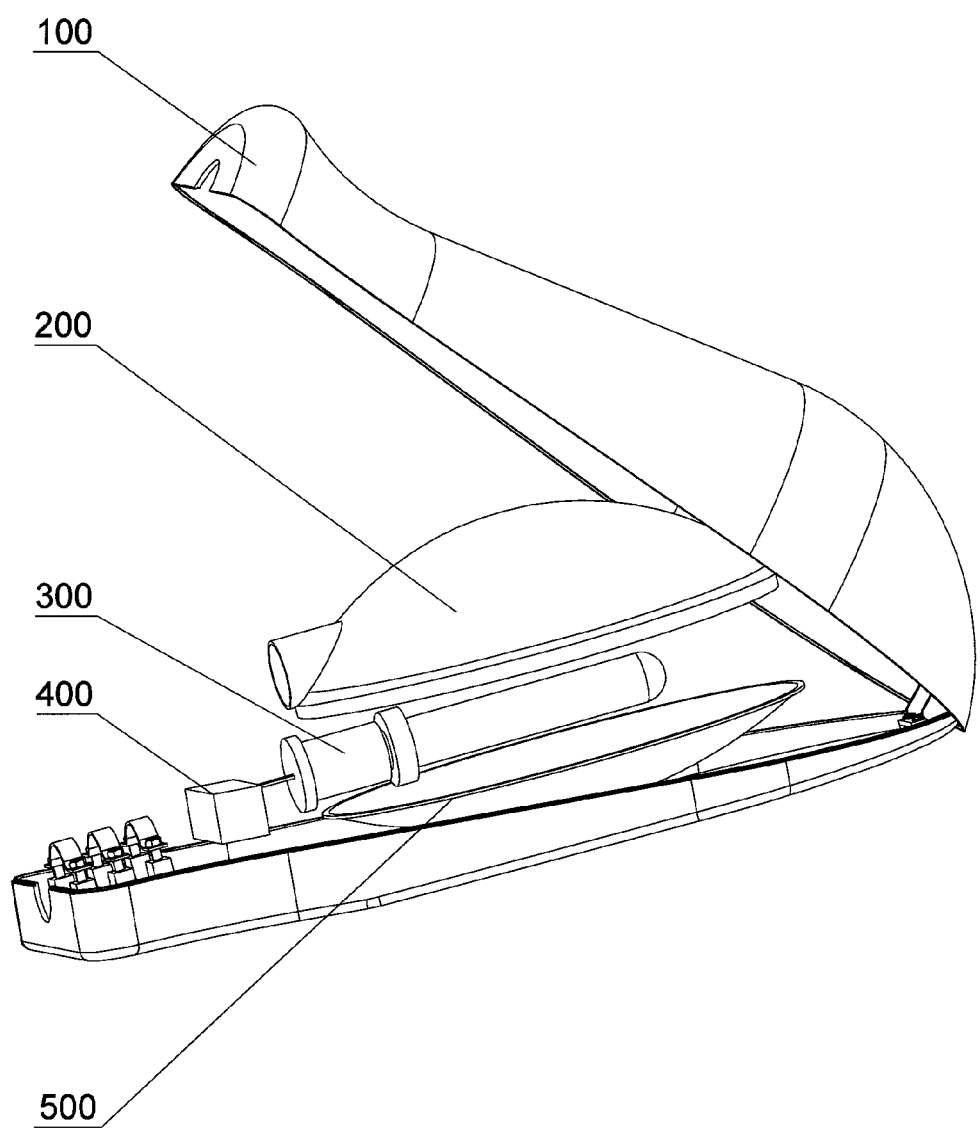
FIG. 1 is a structure diagram of a traditional road lamp.
Figure 2:
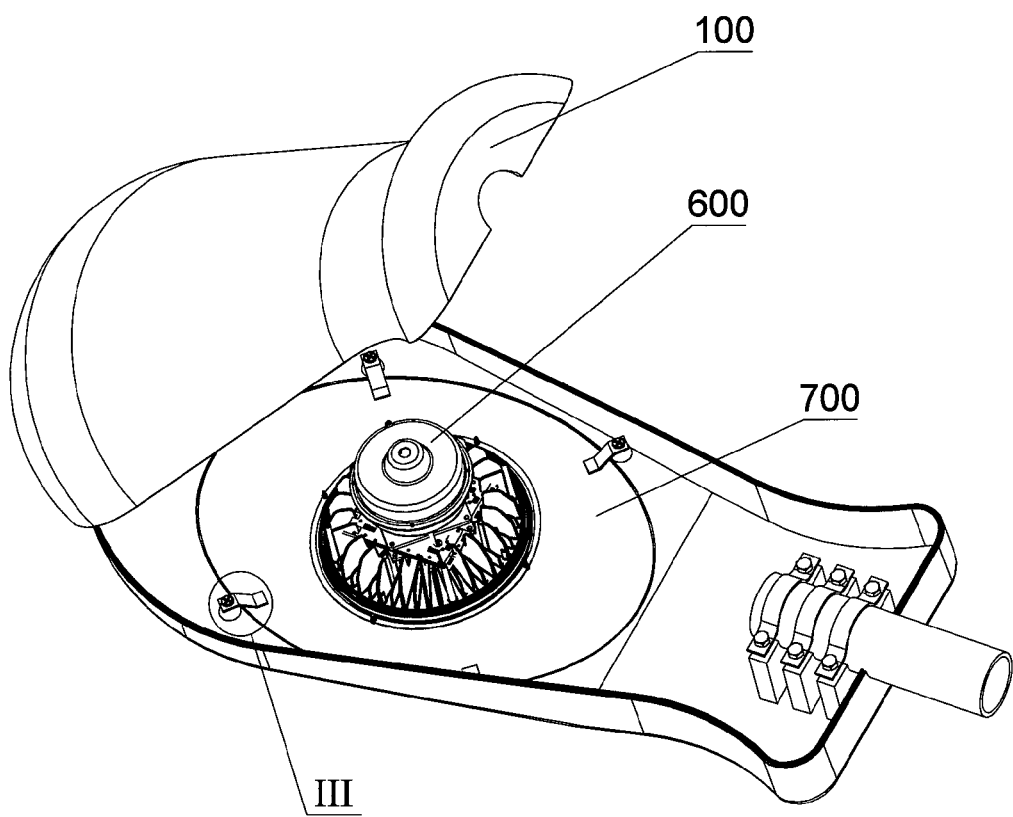
FIG. 2 is a whole structure diagram of the LED road lamp according to one or more embodiments of the present invention.
Figure 3:
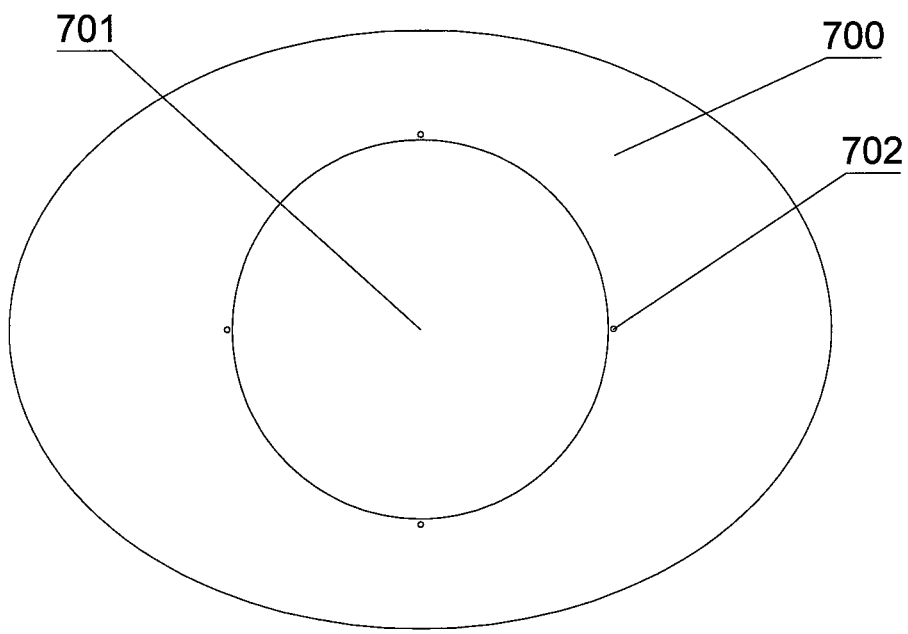
FIG. 3 is a structure diagram of the LED road lamp's install board according to one or more embodiments of the present invention.
Figure 4:
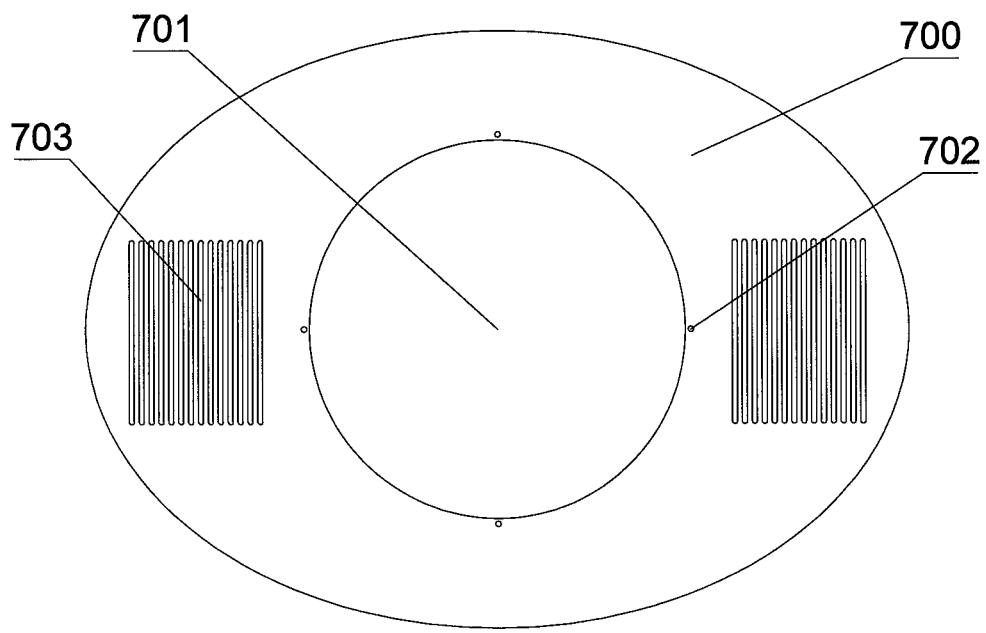
FIGS. 4-6 are the structure diagrams of the LED road lamp's install board according to one or more embodiments of the present invention.

With reference to FIG. 2, FIG. 3 and FIG. 7-FIG. 14, an LED road lamp comprises an LED photo-electric source assembly 600, an installing board 700, and a housing assembly 100 of a traditional road lamp for containing light source, wherein a light outlet 701 arranged on the installing board 700 adapts in size and shape to an opening arranged at the bottom of the housing assembly 100; in this embodiment the installing board 700 is oval, and the light outlet 701 is circular; the LED photo-electric source assembly 600 is fixedly connected to the installing board 700 and emits light through the light outlet 701 and the installing board 700 is fixedly connected with the housing assembly 100 through a clamping fixture; the detailed connecting method as: four installing holes 702 is on the installing board 700 around the light outlet 701; one or more install bolts 98 are fixedly connected to the installing board 700 through the installing holes 702 by a nut 99, afterwards the installing hole 601 of the LED photo-electric source assembly 600, which surrounds the decorate circle 6, is sleeved to the install bolt 98, and another nut 99 is fixedly connected to install bolts 98, thereby the LED photo-electric source assembly components 600 is fixedly connected to the installing board 700. The clamping fixture comprises a roll forming plate 102 and one or more fastening screws 103; four install columns 101 with thread are arranged around the opening at the bottom of the housing assembly 100, on which the edge of the installing board 700 overlaps the clamping fixture; a waterproof jacket 104 is arranged around the edge of installing board 700, and the bottom of the roll forming plate 102 holds down the installing board 700, and the top of the roll forming plate 102 is fixedly connected to an install column 101 by the fastening screw 103, thereby causing the installing board 700 to be fixedly connected to the housing assembly 100.

The LED photo-electric source assembly 600 comprises a radiator 1, a radiating fan 2, a driving circuit board subassembly 3, an LED light source component 4, an annular insulator board 30, an upper cover 31 of a power supply box, a lower cover 32 of the power supply box, a lens 5, a decorate circle 6, a thermal insulation synthetic mica sheet 8, and a waterproof bolt component 34, wherein the LED light source component 4 comprises one or more LED chips and LED submount; the outline of the radiator 1 is circular, the radiator 1 comprises a bottom plate 11 whose underside is flat, on the top face of which a radiating part 12 has a plurality of fins extending perpendicularly outward from the top face and are spaced a distance apart from one another in a circular or cylindrical arrangement in the outer ring and cylindrical inside for increasing heat dissipation channel and improving the cooling performance; in the central area of the upper part of radiating part 12, a space area is provided for containing the radiating fan 2 (e.g., a dust-proof and waterproof fan), so the radiating fan is dustproof and waterproof; in the air intake and air outlet of the radiating fan 2 two fan guards 21 are provided to prevent foreign matter from entering into the fan and offer more security protection; the detailed connecting method as: four third bolts 93 are fixedly connected to radiator 1 orderly going through the upward fan guard 21 of the radiating fan 2, the radiating fan 2 and the downward fan guard 21 of which; on the top of the radiating fan 2 the lower cover 32 is fixedly connected to radiator 1; the upper cover 31 and the lower cover 32 are sealed at their joints with the driving circuit board subassembly 3 inside; the detailed connecting method as: the upper cover 31 and the lower cover 32 are fixedly connected by four fourth bolts 94 and four nuts 97; the annular insulator board 30 is disposed in the sealed space by the upper cover 31 and the lower cover 32 to improve insulation and isolation between power source to the upper cover 31 and the lower cover 32, inside of which the driving circuit board subassembly 3 is provided; the waterproof bolt component 34 connects the port which a power wire can go through the upper cover 31; the power wire (unmarked in the drawings) can be sealed by the waterproof bolt components 34, as it can make the power source waterproof and dustproof; four shores 13 protruding out of the radiator part on the back of the radiator 1 are provided, and the shores 13 supporting the lower cover 32 extend 10-50 mm outwardly beyond the top surface of the radiating fan 2; so this will retain a space to strengthen ventilation for fan's intake and outlet, the detailed connecting method as: four double-screw bolts 96 with internal thread on head and external thread on tail are fixedly connected to the shores 13 going through the lower cover 32; four fifth bolts 95 are fixedly connected with the internal thread of the double-screw bolts 96 going through the driving circuit board subassembly 3; the hole on the driving circuit board subassembly 3 which the fifth bolts 95 pass through is taken to isolate the insulation; the height of the head of the double-screw bolts 96 which the internal thread inside is 5-10 mm; so it can meet the requirements of creepage distances and insulation between driving circuit board subassembly 3 and lower cover 32; the LED submount is fixedly connected to the bottom plate 11 transmitting heat; the detailed connecting method as: the LED submount and the bottom plate 11 are fixed through four first bolts 91, an insulating component 7 (e.g., an insulating rubber) fixed to the first bolts 91 is electrically isolated between the LED submount with the bottom plate 11 and first bolts 91; so this will strengthen insulation and further enhance creepage distances to meet requirement of safety; the thermal insulation synthetic mica sheet 8 is between the LED submount and the bottom plate 11, the edge of which is extends 1-10 mm outward from the edge of the LED submount; the lens 5 and the decorate circle 6 are fixedly connected to the bottom of the radiator 1, the detailed connecting method as: a silicone waterproof gasket 9 is in connection with of the lens 5 at the bottom of the radiator 1 to further enhance waterproof property for the light source part, which is fixedly connected by the second bolts 92 through several installing holes 601 surrounding the decorate circle 6; the upper cover 31 and the lower cover 32 are also circular which is same as the outline of radiator 1, so it is good for reducing overall volume.

The power wire can be sealed by the waterproof bolt component 34 to achieve waterproofing and dustproofing; also, the radiating fan 2 is waterproof and dustproof; also the decorate circle 6 and the lens 5 are fixed jointly with the bottom of the radiator 1 to make the light source part waterproof and dustproof; so based on above this whole LED photo-electric source assembly 600 is waterproof and dustproof, and it is very suitable for the road lamp especially; also this LED lamp has initiative heat dissipation and passive heat dissipation after combined the radiating fan 2 to the radiator 1, so it will improve stabilization and service life; a thermal insulation synthetic mica sheet 8 is between the LED submount and the bottom plate 11, the synthetic mica sheet 8 is composed of Mica mineral raw materials and then the mica sheet is pressed between the LED submount and the bottom plate with mucilage glue at a high temperature, advantageously providing excellent thermal conductivity, fire resistance and electrical insulating properties, homogeneous thick, adjustable area/size, flexibility and processability; the heat conductivity coefficient for the synthetic mica sheet is 5 W/(m·K)-24 W/(m·K), which is higher than thermally conductive silicone and conductive empire cloth; also the mica sheet has a stable state with higher uniformity, to cause the LED submount and bottom plate to closely and uniformly touch, and provides better heat dissipation, insulating properties, easy installation, and high efficiency; due to the edge of mica sheet extending 1-10 mm outward from the edge of LED submount, it can be meet the requirements of creepage distances between the LED submount and radiator to improve safety; so this invention of the LED photo-electric source assembly is simple structure, higher production efficiency, good heat dissipation and thermal insulation, and is well waterproofed and dustproofed; when the LED photo-electric source assembly 600 is working, the radiating fan 2 is working at the same time, the thermic from LED chip brightens through the LED submount and the mica sheet 8 to conduct to the radiator 1, the radiator 1 has the same passive heat dissipation as current radiators, which let one part of thermic flow to air, also, under the effect of the radiating fan 2, the outside air was forced to flow through the radiator 1, thereby taking away thermic on radiator 1 to avoid LED chip having to work under high temperature which extends service life; due to forcible heat dissipation, it can have reduced weight and volume of radiator than a normal lamp and thereby enhance the adaptation.

Embodiment II

As shown in FIG. 4 and FIGS. 15-20, an embodiment of LED road lamp improved from traditional road lamp is different from embodiment I is provided as: this embodiment has removed decorate circle 6; also, the LED photo-electric source assembly components 600 further comprise a wind scooper 10 with a flared shape; the wind scooper 10 is fixedly connected to the radiator 1 by one or more connecting bolts 98 across the top edge of the wind scooper 10, which surrounds the side of the radiating part 12; an annular air outlet 61 between bottom of the wind scooper 10 with bottom of the radiator 1 is provided; the outside air flows into the radiating fan 2 from the space between the lower cover 32 with the radiator 1, and flows outside through the annular air outlet 61 after passing through the channel inside of the radiating part 12; the bottom of the wind scooper 10 has an outer edge arranged, to hold down the installing board 700 and is fixedly connected by bolts, and adapts in size to the gap on installing board 700; the air inside the housing assembly 100 flows outside through the annular air outlet 61 by the radiator fan 2; also, two radiator parts which are made of one or more ventilation slots 703 in the installing board 700 are provided to improve circulation and cooling for inner air and outside air of the housing assembly 100.

Furthermore, this embodiment of installing board of LED photo-electric source assembly is different from embodiment I as: in this embodiment, installing holes 702 are on the installing board 700 around the light outlet 701; one or more install bolts 98 are fixedly connected to the installing board 700 through the installing holes 702 by a nut 99, and thereafter the installing hole 602 in the around of the wind scooper 10 is sleeved to the install bolt 98, and a snap joint 970 is fixedly connected to install bolts 98, thereby the LED photo-electric source assembly components 600 are fixedly connected to the installing board 700; wherein the snap joint 970 comprises a notched subject 971, a slider 972, a reset spring 973, the subject 971 and the slider 972 each arranged with an axle hole 975, 974 for member bars to pass through; the diameters of the install bolts 98 are smaller than the diameters of the axle holes 975, 974; relying on elastin of the reset spring 973, the holes 975, 974 are to close the screw part of the install bolts 98 relative to each other, and thereby fixing the joint with the install bolts 98 by side force; the speed for this snap connecting method being faster than the convention.

The air inside of the housing assembly 100 of LED road lamp flows outside from the annular air outlet 61 through the radiator 2; to facilitate this, the inner and outer air on outer casing are made circular, and thus avoid high temperature by inner circular on outer casing, without needing to install an extra outer exhaust fan, without affecting the lamp's appearance, but improving the product's stabilization; further, the annular air outlet 61 between the bottom of wind scooper 10 and radiator 1 enhances more decoration; so this invention of LED road lamp has a simple structure, good heat dissipation, low inner working temperature, and no additional costs.

Figure 19:
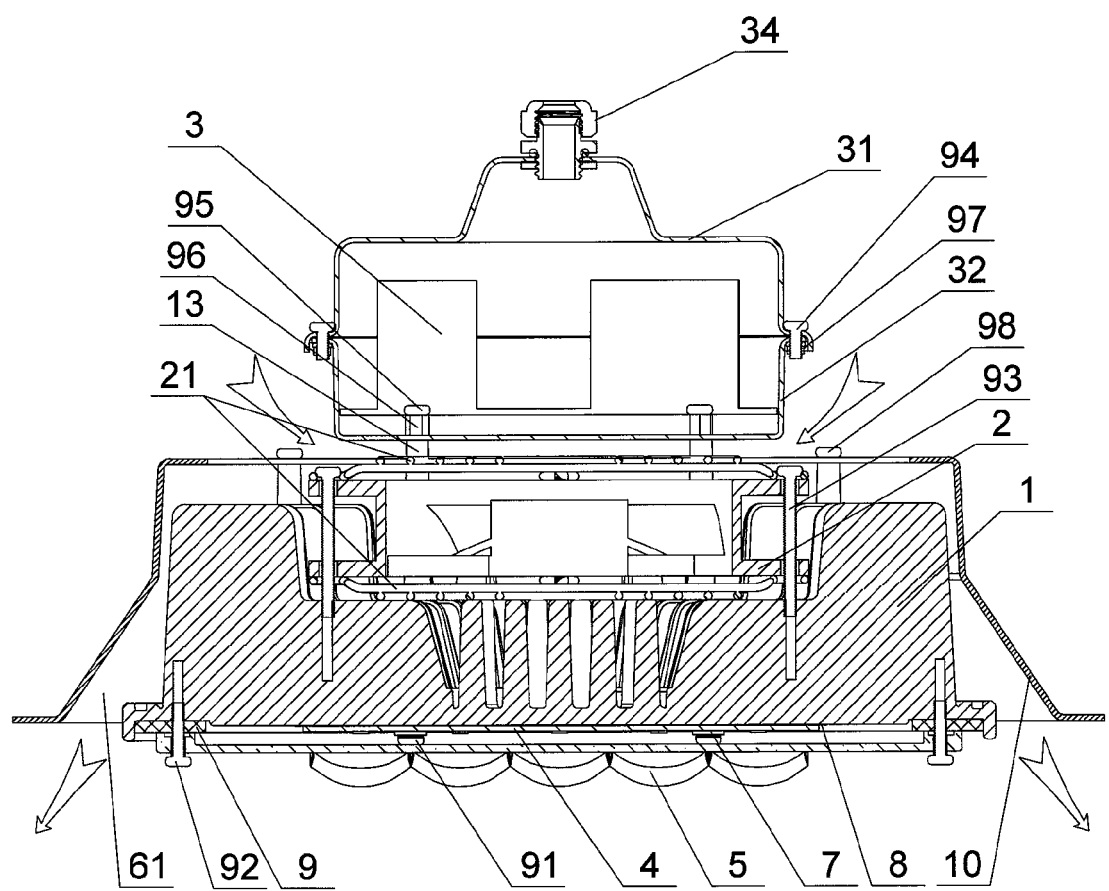
FIG. 19 is a cross-section diagram of the LED photo-electric source assembly according to one or more embodiments of the present invention.
Figure 20:
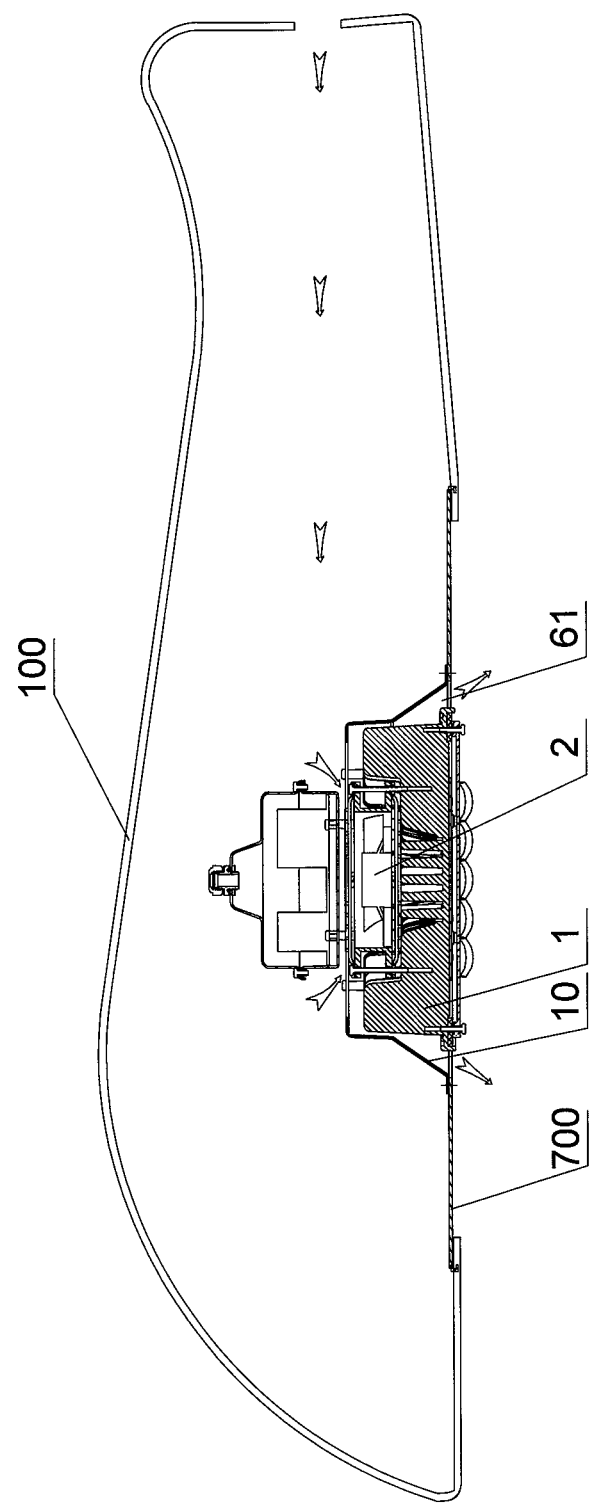
FIG. 20 is a cross-section diagram of the LED road lamp according to one or more embodiments of the present invention.

The air through into the radiating fan 2 is deflected by the wind scooper 10 and made to fully flow from the top of the lamp in through the bottom of the lamp out along the flow path as shown in FIGS. 19 and 20, thereby making heat air fully flow through the radiator 1, and avoid blind areas and turbulence, and also avoid the abuse by cooling air unable to disperse with high temperature on internal recycling; so it takes the cooling air flow outside the lamp quickly and reduces the lamp's working temperature; also the whole LED photo-electric source assembly is waterproof and dustproof, it can be applied outside and in a dusty workshop, in a factory as a basic component for a road lamp, ceiling lamp, down lamp, bulkhead lamp, etc.

Other features of this embodiment are the same as Embodiment I.

Embodiment III

Figure 5:
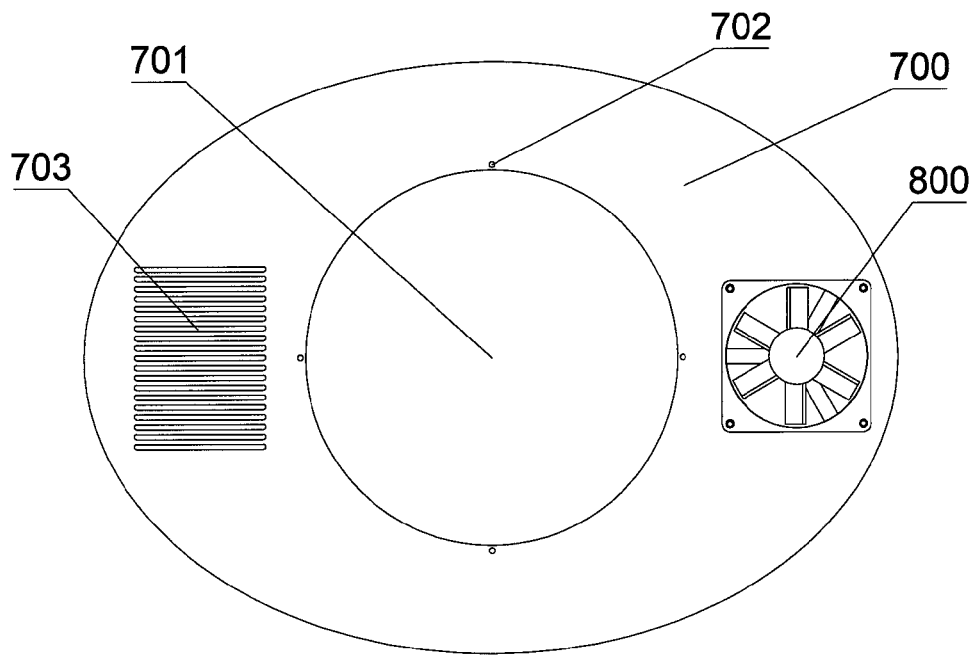

As shown in FIG. 5, this embodiment of the LED road lamp improved from traditional road lamp is different from embodiment I as: several ventilation slots 703 as a heat part in the installing board 700 are provided. Further, an installation hole for the fan is in the installing board 700, and an outer radiating fan 800 is on the installation hole. In this way, inner air and outside air circulation of the housing assembly 100 is improved.

Other characters in this embodiment are the same as Embodiment I.

Embodiment IV

Figure 6:
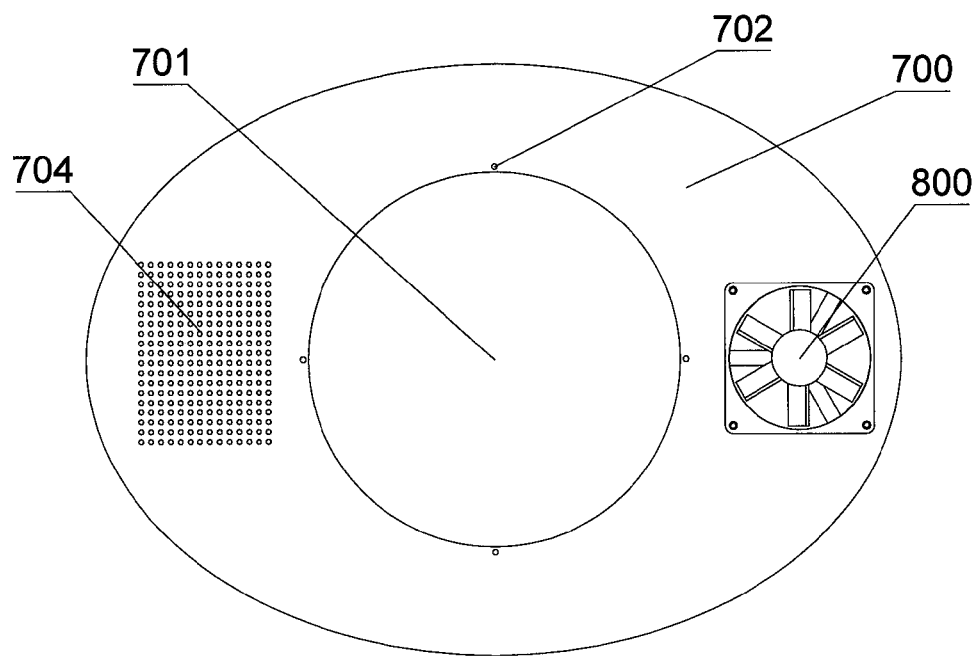
Figure 7:
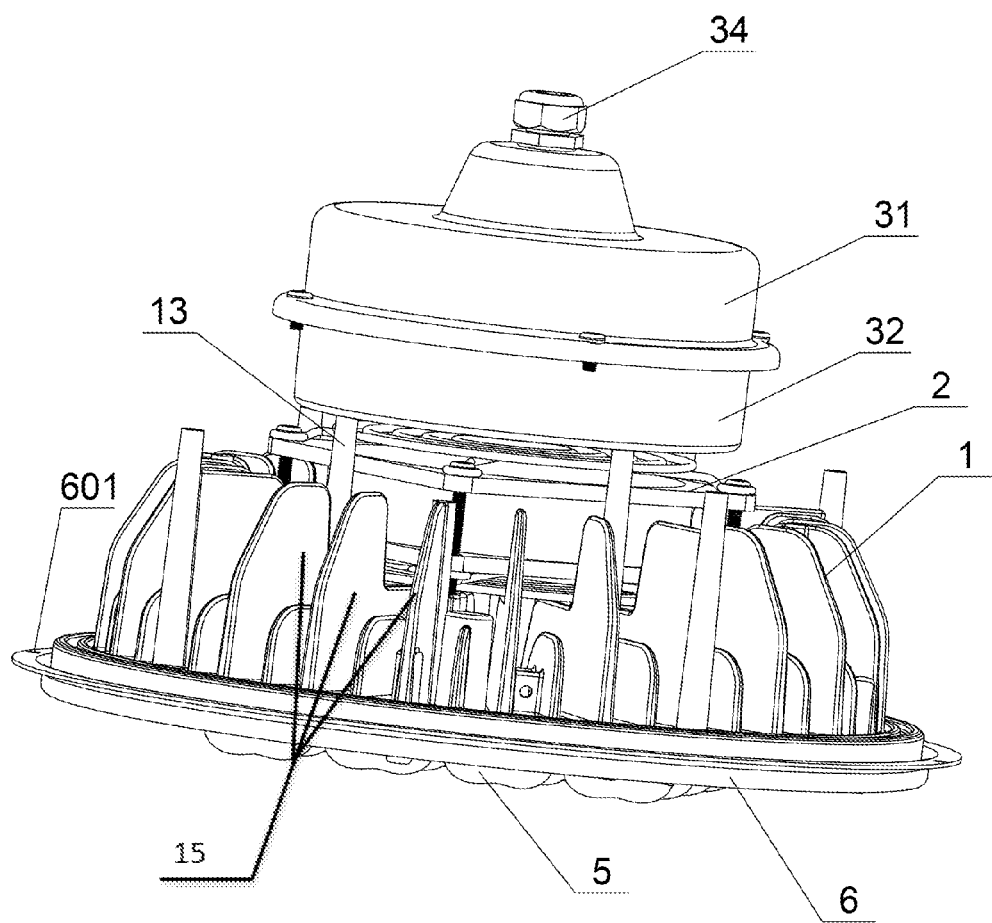
FIG. 7 is a stereoscopic-section diagram of the LED photo-electric source assembly according to one or more embodiments of the present invention.
Figure 8:
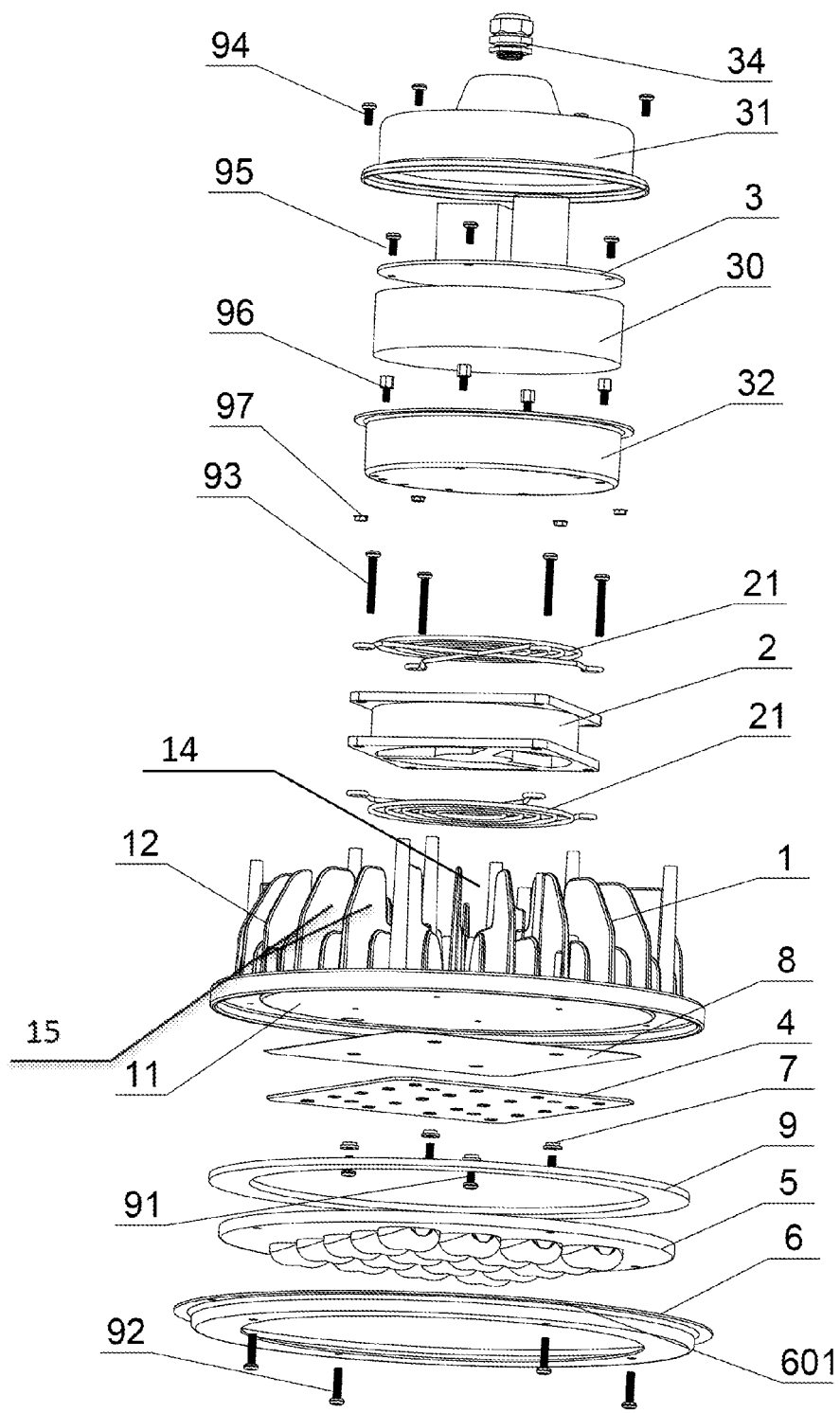
FIG. 8 is a disassembly diagram of the LED photo-electric source assembly according to one or more embodiments of the present invention.
Figure 9:
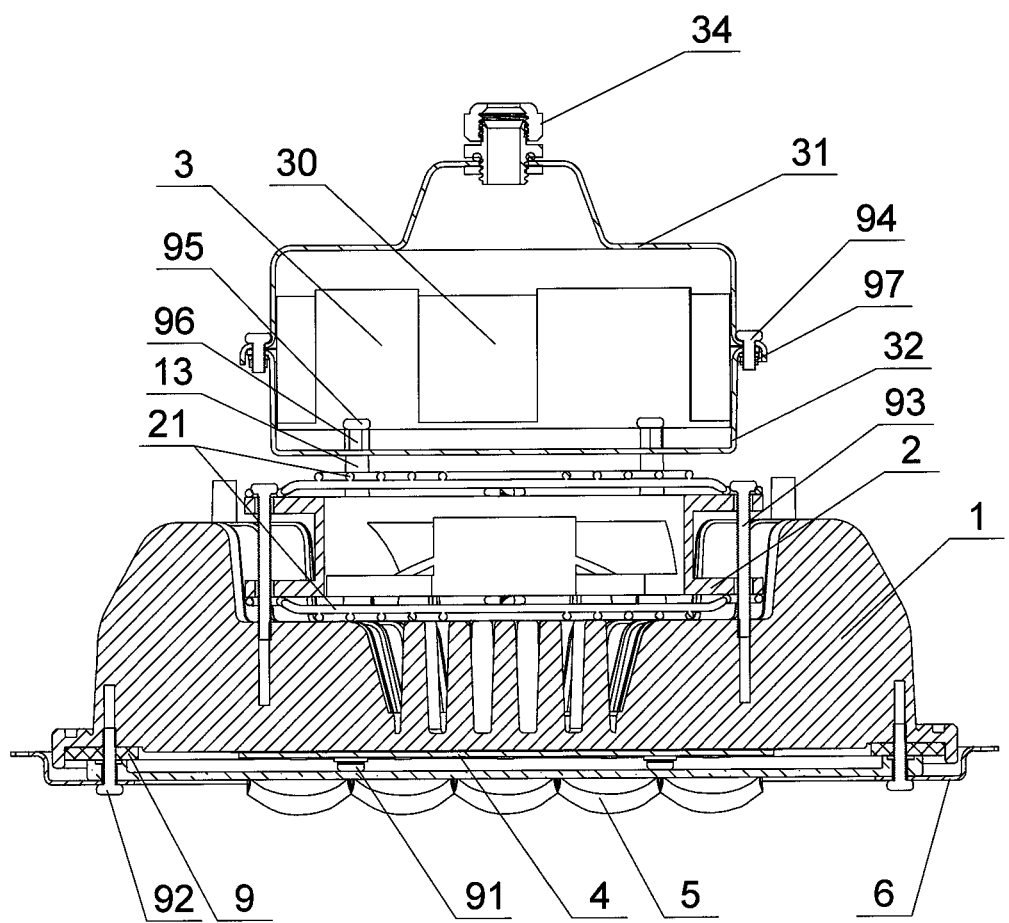
FIG. 9 is a cross-section diagram of the LED photo-electric source assembly according to one or more embodiments of the present invention.
Figure 10:
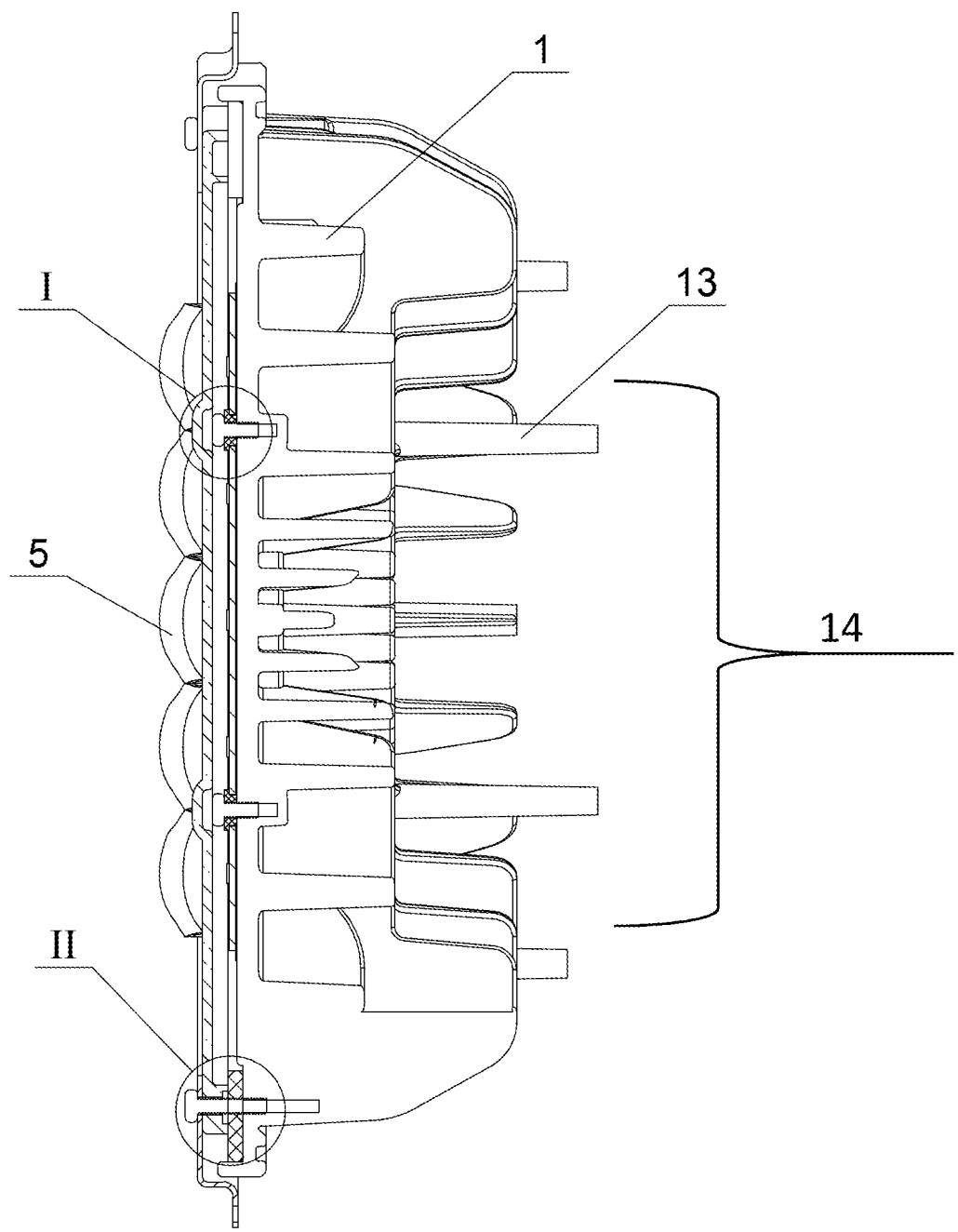
FIG. 10 is a cross-section diagram of the radiator and light source part of the LED photo-electric source assembly according to one or more embodiments of the present invention.
Figure 11:
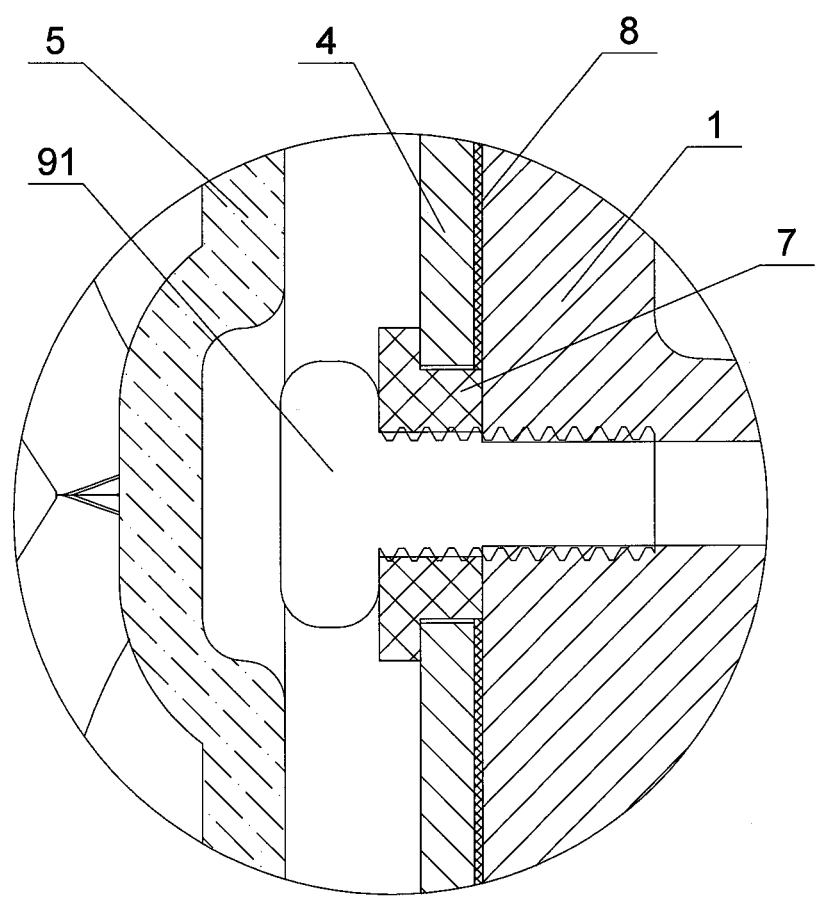
FIG. 11 is a magnified view of the structure diagram of FIG. 10 identified by remark I.
Figure 12:
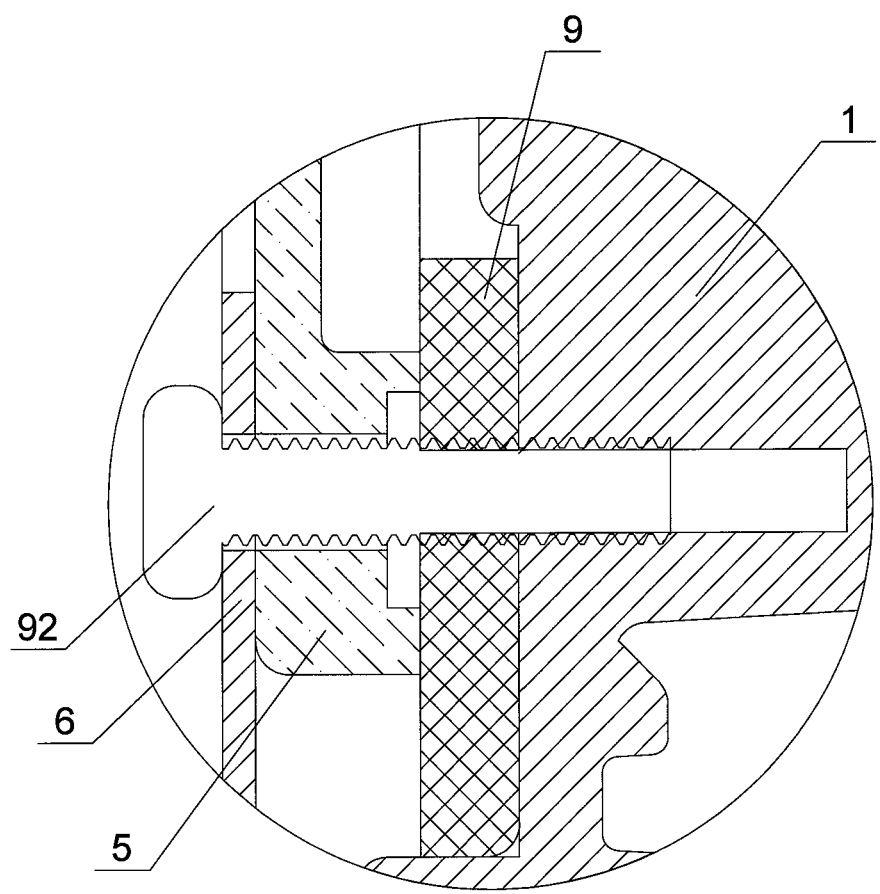
FIG. 12 is a magnified view of the structure diagram of FIG. 10 identified by remark II.
Figure 13:
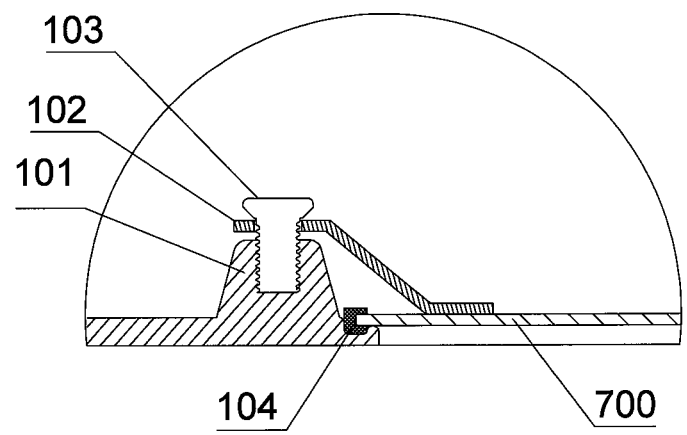
FIG. 13 is a magnified view of the connecting structure diagram of the installing board having an outer casing of FIG. 2 identified by remark III.
Figure 14:
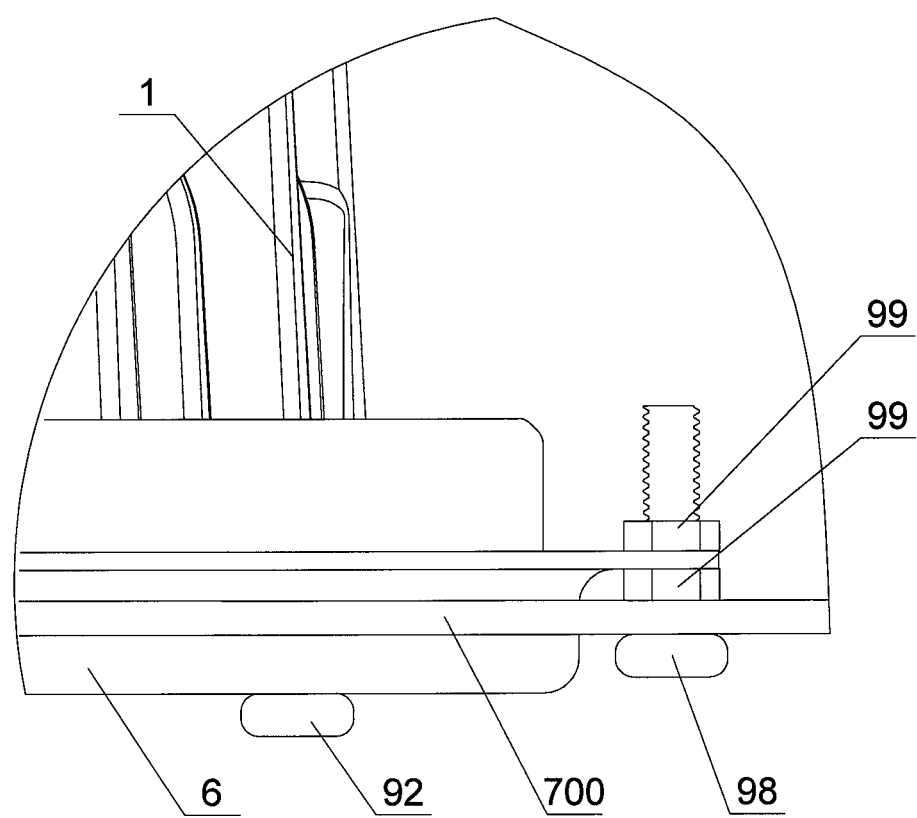
FIG. 14 is a connecting structure diagram of installing board with LED photo-electric source assembly according to Embodiment I of the present invention.
Figure 15:
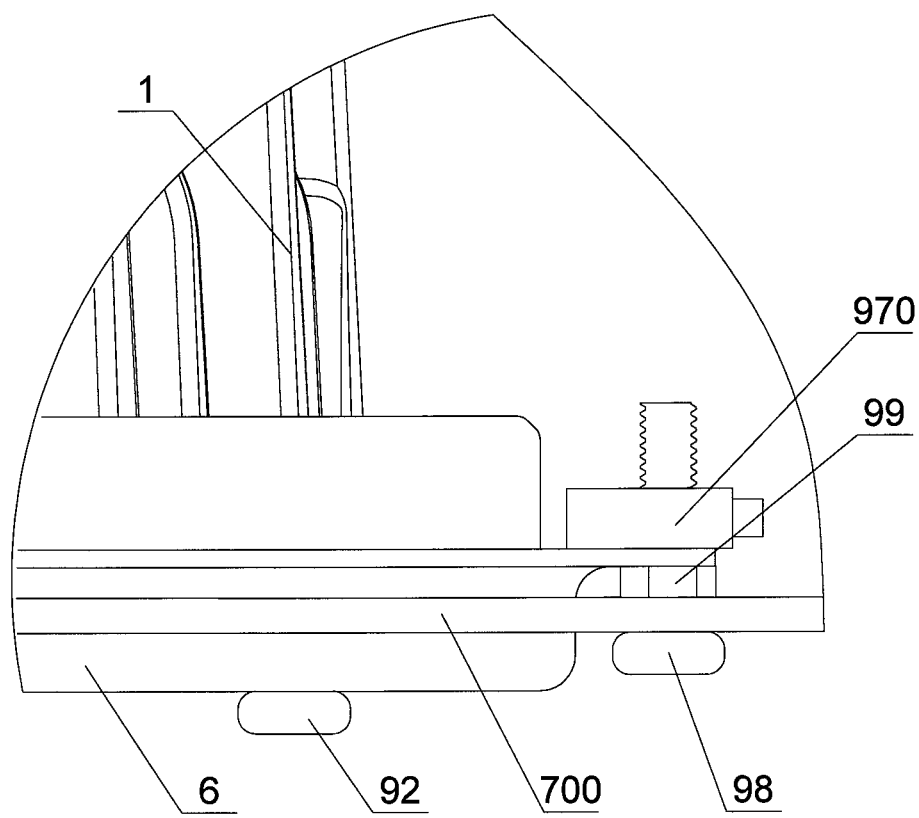
FIG. 15 is a connecting structure for installing board with LED photo-electric source assembly according to one or more embodiments of the present invention.
Figure 16:
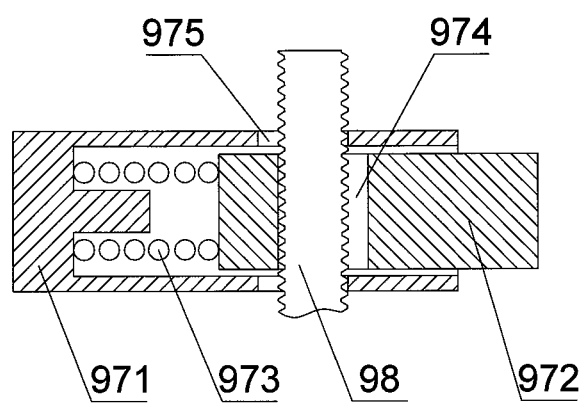
FIG. 16 is a connecting structure diagram of a snap joint with installing bolt as illustrated in FIG. 15.
Figure 17:
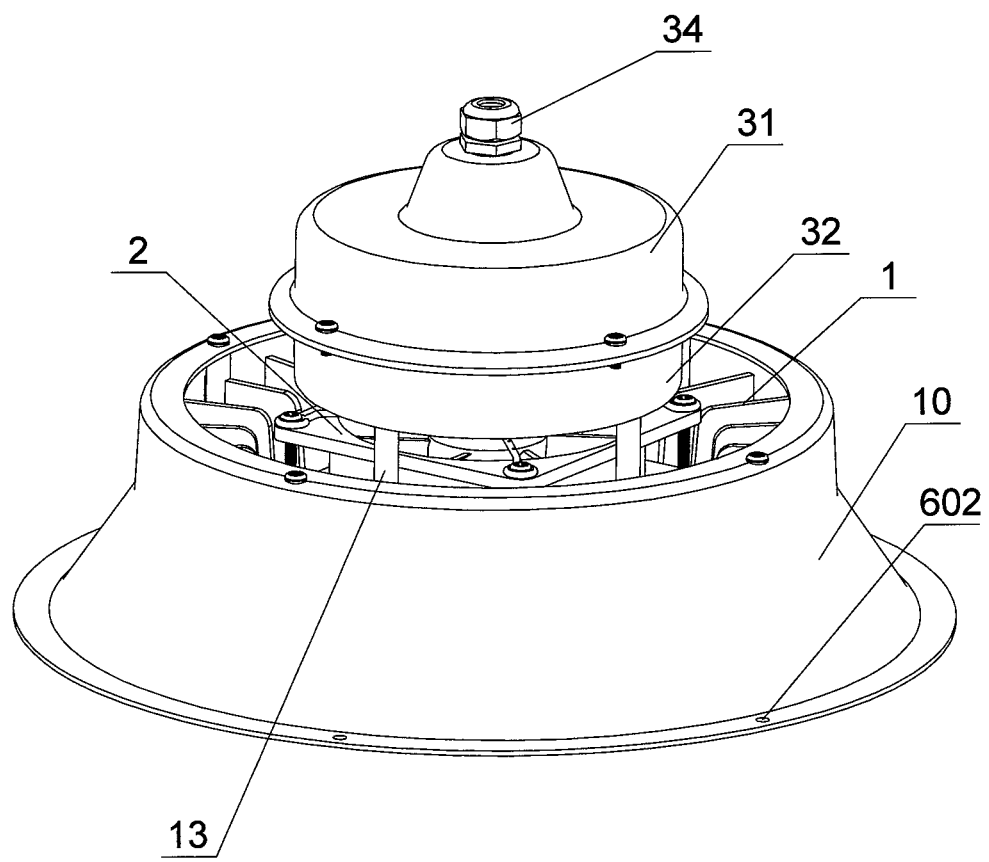
FIG. 17 is a stereoscopic-section diagram of the LED photo-electric source assembly according to one or more embodiments of the present invention.
Figure 18:
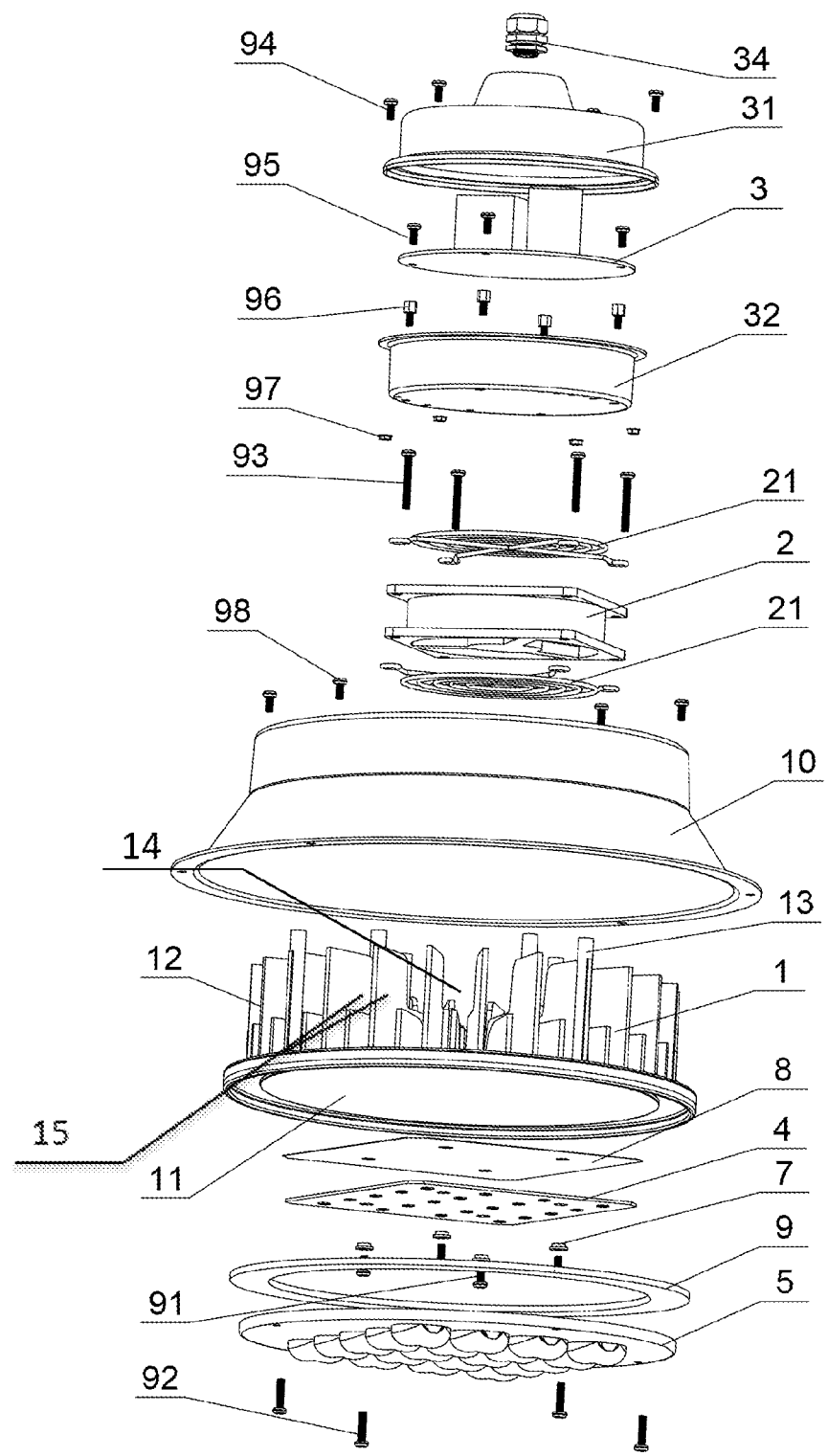
FIG. 18 is a disassembly diagram of the LED photo-electric source assembly according to one or more embodiments of the present invention.

As shown in FIG. 6, this embodiment of the improved LED road lamp from the traditional road lamp is different from embodiment I as: one or more ventilation holes 704 as a heat part in the installing board 700 are provided. Further, an installation hole for the fan is in the installing board 700, and an outer radiating fan 800 is on the installation hole. In this way, inner air and outside air circulation of the housing assembly 100 is improved.

Other characters in this embodiment are the same as Embodiment I.

This invention can be widely applied to the field of LED illumination.

The invention claimed is:
1. An LED photo-electric source assembly, comprising:
a radiator, a radiating fan that is dust-proof and water-proof,
a driving circuit board subassembly,
an LED light source component,
a power supply box having an upper cover with a port, and a lower cover sealed with the upper cover, thereby defining a sealed space therebetween;
an annular insulator board, disposed in the sealed space between the upper cover and the lower cover, and surrounding the driving circuit board subassembly; and
a waterproof bolt component, wherein
the LED light source component comprises one or more LED chips and a LED submount;
the radiator comprises a bottom plate whose underside is flat, on top of which a radiating part having a plurality of fins spaced a distance apart from one another in a circular or cylindrical arrangement is provided, in which the radiating part includes a space disposed substantially in the center of the radiating part for containing the radiating fan, and at least two shores extend outwardly from the radiator part beyond a top surface of the plurality of fins to support the lower cover;
the LED submount is connected to the bottom plate that transmits heat;
a thermal insulation synthetic mica sheet is provided between the LED submount and the bottom plate, wherein an edge of the thermal insulation mica sheet extends outward from an edge of the LED submount;
the LED submount and the bottom plate are fixed through one or more first bolts, an insulating component envelops an end of the one or more first bolts and provides electrical isolation between the LED submount and both the bottom plate and the one or more first bolts;
the radiating fan further comprises an air intake and an air outlet having top and bottom surfaces positioned in planes substantially parallel to one another, wherein a first fan guard is provided in the air intake and a second fan guard is provided in the air outlet;
wherein on top of the radiating fan the lower cover is connected to the radiator;
wherein the driving circuit board subassembly is disposed in the sealed space between the upper cover and the lower cover; and
the waterproof bolt component connects to the port on the upper cover, wherein a power wire passes through the port of the upper cover.

2. The LED photo-electric source assembly according to claim 1, further comprising a wind scooper, wherein
the wind scooper is connected to the radiator by one or more connecting bolts that pass through one or more installing holes formed along the top edge of the wind scooper, such that the wind scooper surrounds at least one side of the radiating part;
an annular air outlet is provided between the bottom of the inner surface of the wind scooper and the bottom of the outer surface of the radiator; and
the outside air flows into the radiating fan from a space between the lower cover and the radiator, through a channel disposed inside of the radiating part and flows outside the LED photo-electric source assembly through the annular air outlet.

3. The LED photo-electric source assembly according to claim 2, further comprising a lens, which is connected to the bottom of the radiator by one or more second bolts that pass through one or more installation holes formed in the lens and the bottom of the radiator, wherein a silicone waterproof gasket is provided between the bottom of the radiator and the lens.

4. The LED photo-electric source assembly according to claim 2, wherein the wind scooper has a first end and a second end in which an outer surface of the wind scooper broadens from the first end to the second end to resemble a flared shape.

5. An LED road lamp improved from a traditional road lamp, comprising:
an LED photo-electric source assembly, wherein the LED photo-electric source assembly comprises:
a radiator having a bottom plate whose underside is flat, on top of which a radiating part having a plurality of fins spaced a distance apart from one another in a circular or cylindrical arrangement is provided, in which the radiating part includes a space disposed substantially in the center of the radiating part for containing the radiating fan;
a dust-proof and water-proof radiating fan having an air intake and an air outlet, wherein a first fan guard is provided in the air intake and a second fan guard is provided in the air outlet;
an LED light source component having one or more LED chips and a LED submount connected to the bottom plate transmitting heat;
a power supply box having an upper cover with a port, and a lower cover sealed with the upper cover, wherein the lower cover is connected to the radiator at the top of the radiating fan;
a driving circuit board subassembly is positioned between the upper cover and the lower cover of the power supply box; and
a waterproof bolt component connects to the port on the upper cover, wherein a power wire passes through the port of the upper cover;
an installing board;
a housing assembly for containing the LED photo-electric source assembly;
a light outlet arranged on the installing board is adapted in size and shape to correspond to an opening arranged at the bottom of the housing assembly,
wherein the LED photo-electric source assembly is connected to the installing board and emits light through the light outlet and the remainder of the LED photo-electric source assembly is shielded by the housing assembly, and
the installing board is connected with the housing assembly through a clamping fixture, wherein,
the clamping fixture includes a roll forming plate having a bottom portion in contact with the installing board such that the installing board is coupled to the housing assembly, a top portion that includes one or more openings in which one or more fastening screws having threaded outer surfaces pass through, and a central portion connecting the bottom and top portions such that the bottom and top portions are disposed in planes parallel to one another;
one or more install columns having inner threaded surfaces are arranged around the opening at the bottom of the housing assembly, on which the edge of the installing board overlaps an edge of each of the one or more install columns;
a waterproof jacket is arranged around the edge of installing board; and the installing board is connected to the housing assembly by threading the one or more fastening screws through the top portion of the roll forming plate into the one or more install columns.

6. The LED road lamp according to claim 5, wherein one or more installing holes are formed on the installing board around the light outlet; and the LED photo-electric source assembly is connected to the installing board by passing an end of one or more install bolts through a first nut and into the one or more installing holes, such that a portion of the end passed through the one or more installing holes extends outward from the installing board whereby a snap joint is connected to the passed through end of the one or more install bolts to hold the install bolts in place.

7. The LED road lamp according to claim 5, wherein one or more ventilation slots or one or more ventilation holes are provided in the installing board.

8. The LED road lamp according to claim 5, further comprising
an outer radiating fan disposed in an installation hole formed in an outer surface of the installing board.

9. An LED photo-electric source assembly, comprising:
a radiator,
a radiating fan that is dust-proof and water-proof,
a driving circuit board subassembly,
an LED light source component,
a power supply box having an upper cover with a port, and a lower cover sealed with the upper cover, thereby defining a sealed space therebetween; and
a waterproof bolt component, wherein
the LED light source component comprises one or more LED chips and a LED submount;
the radiator comprises a bottom plate whose underside is flat, on top of which a radiating part having a plurality of fins spaced a distance apart from one another in a circular or cylindrical arrangement is provided, in which the radiating part includes a space disposed substantially in the center of the radiating part for containing the radiating fan, and at least two shores extend outwardly from the radiator part beyond a top surface of the plurality of fins to support the lower cover;
the LED submount is connected to the bottom plate that transmits heat;
the radiating fan further comprises an air intake and an air outlet having top and bottom surfaces positioned in planes substantially parallel to one another, wherein a first fan guard is provided in the air intake and a second fan guard is provided in the air outlet;
wherein on top of the radiating fan the lower cover is connected to the radiator;
wherein the driving circuit board subassembly is disposed in the sealed space between the upper cover and the lower cover;
the waterproof bolt component connects to the port on the upper cover, wherein a power wire passes through the port of the upper cover; and wherein
one or more third bolts are connected to the radiator orderly going through the first fan guard of the radiating fan, the radiating fan and the second fan guard thereof;
the upper cover and the lower cover are connected by one or more fourth bolts and one or more nuts;
one or more hollow double-screw bolts having an internal thread along an inner surface of the double-screw bolt that originates at the double-screw bolt head and having an external thread along an outer surface of the double-screw bolt that originates at the double-screw bolt tail, for connecting the at least two shores to the lower cover;
one or more fifth bolts are connected to the internal thread of the double-screw bolts after passing through the driving circuit board subassembly; and
a shape of the radiator is circular, and a shape of the upper cover and the lower cover are also circular.

10. An LED photo-electric source assembly, comprising:
a radiator,
a radiating fan that is dust-proof and water-proof,
a driving circuit board subassembly,
an LED light source component,
a power supply box having an upper cover with a port, and a lower cover sealed with the upper cover, thereby defining a sealed space therebetween,
a lens,
a decorate circle,
and a silicone waterproof gasket, and
a waterproof bolt component, wherein
the LED light source component comprises one or more LED chips and a LED submount;
the radiator comprises a bottom plate whose underside is flat, on top of which a radiating part having a plurality of fins spaced a distance apart from one another in a circular or cylindrical arrangement is provided, in which the radiating part includes a space disposed substantially in the center of the radiating part for containing the radiating fan, and at least two shores extend outwardly from the radiator part beyond a top surface of the plurality of fins to support the lower cover;
the LED submount is connected to the bottom plate that transmits heat;
the radiating fan further comprises an air intake and an air outlet having top and bottom surfaces positioned in planes substantially parallel to one another, wherein a first fan guard is provided in the air intake and a second fan guard is provided in the air outlet;
each of the lens, the decorate circle, and the silicone waterproof gasket have one or more installing holes formed near the outer edge of each's circumference, and
the lens, the decorate circle, and the silicone waterproof gasket are connected to the bottom of the radiator by one or more second bolts through the one or more installing holes;
wherein on top of the radiating fan the lower cover is connected to the radiator;
wherein the driving circuit board subassembly is disposed in the sealed space between the upper cover and the lower cover; and
the waterproof bolt component connects to the port on the upper cover, wherein a power wire passes through the port of the upper cover.

11. An LED road lamp improved from a traditional road lamp, comprising:
an LED photo-electric source assembly, wherein the LED photo-electric source assembly comprises:
a radiator having a bottom plate whose underside is flat, on top of which a radiating part having a plurality of fins spaced a distance apart from one another in a circular or cylindrical arrangement is provided, in which the radiating part includes a space disposed substantially in the center of the radiating part for containing the radiating fan;

a dust-proof and water-proof radiating fan having an air intake and an air outlet, wherein a first fan guard is provided in the air intake and a second fan guard is provided in the air outlet;

an LED light source component having one or more LED chips and a LED submount connected to the bottom plate transmitting heat;

a power supply box having an upper cover with a port, and a lower cover sealed with the upper cover, wherein the lower cover is connected to the radiator at the top of the radiating fan;

a driving circuit board subassembly is positioned between the upper cover and the lower cover of the power supply box;

a waterproof bolt component connects to the port on the upper cover, wherein a power wire passes through the port of the upper cover; and a wind scooper, wherein
the wind scooper surrounds a side of the radiating part and is connected to the radiator by one or more connecting bolts across the top edge of the wind scooper, and wherein an outer edge of a bottom of the wind scooper is adapted in size to the light outlet on the installing board and arranged to connect to and hold down the installing board to the housing assembly by one or more install bolts; and an annular air outlet is provided between the bottom of the wind scooper and the bottom of the radiator, wherein
air flows into the radiating fan from a space between the lower cover and the radiator and flows outside through the annular air outlet after passing through a channel inside of the radiating part;

an installing board;

a housing assembly for containing the LED photo-electric source assembly;

a light outlet arranged on the installing board is adapted in size and shape to correspond to an opening arranged at the bottom of the housing assembly,
wherein the LED photo-electric source assembly is connected to the installing board and emits light through the light outlet and the remainder of the LED photo-electric source assembly is shielded by the housing assembly, and the installing board is connected with the housing assembly through a clamping fixture.

12. The LED road lamp according to claim 11, wherein the wind scooper has a first end and a second end in which an outer surface of the wind scooper broadens from the first end to the second end to resemble a flared shape.

* * * * *